(12) United States Patent
Sou et al.

(10) Patent No.: US 10,506,211 B2
(45) Date of Patent: Dec. 10, 2019

(54) RECORDING MEDIUM, IMAGE GENERATION APPARATUS, AND IMAGE GENERATION METHOD

(71) Applicant: SQUARE ENIX CO., LTD., Tokyo (JP)

(72) Inventors: Kaei Sou, Tokyo (JP); Jason Lacroix, Tokyo (JP)

(73) Assignee: SQUARE ENIX CO., LTD., Tokyo (JP)

(*) Notice: Subject to any disclaimer, the term of this patent is extended or adjusted under 35 U.S.C. 154(b) by 0 days.

(21) Appl. No.: 15/915,540

(22) Filed: Mar. 8, 2018

(65) Prior Publication Data
US 2018/0270463 A1    Sep. 20, 2018

(30) Foreign Application Priority Data
Mar. 16, 2017 (JP) ................... 2017-051649

(51) Int. Cl.
*H04N 13/117* (2018.01)
*G02B 27/01* (2006.01)
*H04N 13/344* (2018.01)

(52) U.S. Cl.
CPC ....... *H04N 13/117* (2018.05); *G02B 27/0172* (2013.01); *H04N 13/344* (2018.05); *G02B 2027/0134* (2013.01)

(58) Field of Classification Search
CPC ............... H04N 13/344; H04N 13/117; G02B 27/0172; G02B 2027/0134
See application file for complete search history.

(56) References Cited

U.S. PATENT DOCUMENTS

| 6,429,867 | B1 * | 8/2002 | Deering | G06T 9/00 345/423 |
| 2015/0049004 | A1 * | 2/2015 | Deering | G02B 27/0172 345/8 |
| 2015/0356784 | A1 * | 12/2015 | Miller | G06F 3/011 345/633 |
| 2016/0191893 | A1 * | 6/2016 | Gewickey | H04N 13/025 386/223 |
| 2016/0219262 | A1 * | 7/2016 | Cole | H04N 13/0048 |
| 2018/0262745 | A1 * | 9/2018 | Cole | H04N 13/183 |
| 2018/0270464 | A1 * | 9/2018 | Harviainen | H04N 13/128 |
| 2018/0330652 | A1 * | 11/2018 | Perreault | G02B 27/0075 |
| 2018/0373200 | A1 * | 12/2018 | Shi | G03H 1/02 |

FOREIGN PATENT DOCUMENTS

JP   2016-192029   11/2016

* cited by examiner

*Primary Examiner* — Fernando Alcon
(74) *Attorney, Agent, or Firm* — Greenblum & Bernstein, P.L.C.

(57) ABSTRACT

A computer that generates a binocular stereoscopic image associated with content executes acquisition processing for acquiring information regarding movement of a viewpoint of a viewer, and generation processing for rendering and generating left-eye and right-eye images associated with a binocular stereoscopic view corresponding to the movement of the viewpoint of the viewer. In the generation processing, a first region in which an element to be stereoscopically perceived is rendered in accordance with the movement of the viewpoint of the viewer is restricted to a portion of each of the left-eye and right-eye images, and the element to be stereoscopically perceived is not rendered in a second region that is a region other than the first region.

13 Claims, 11 Drawing Sheets

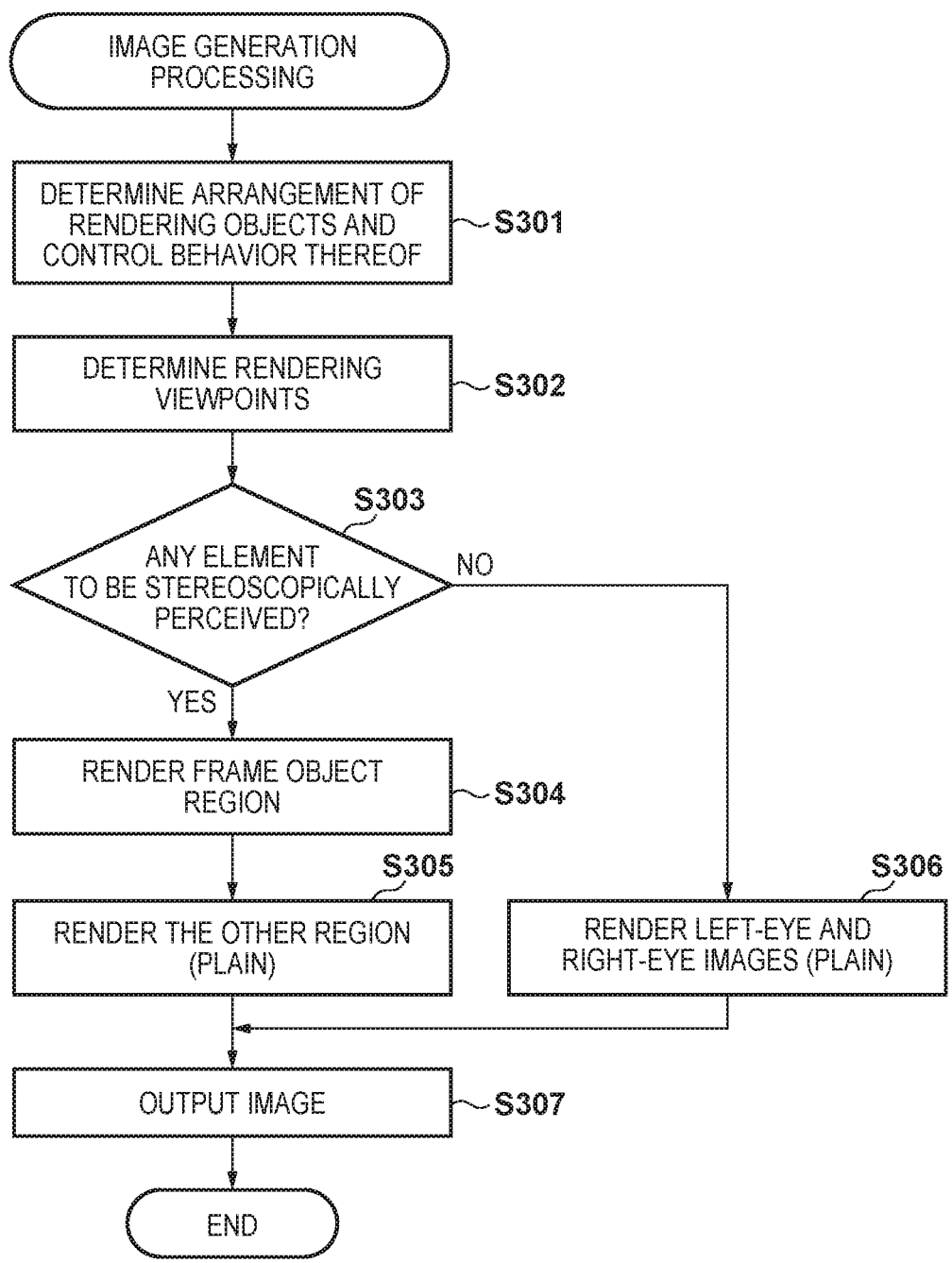

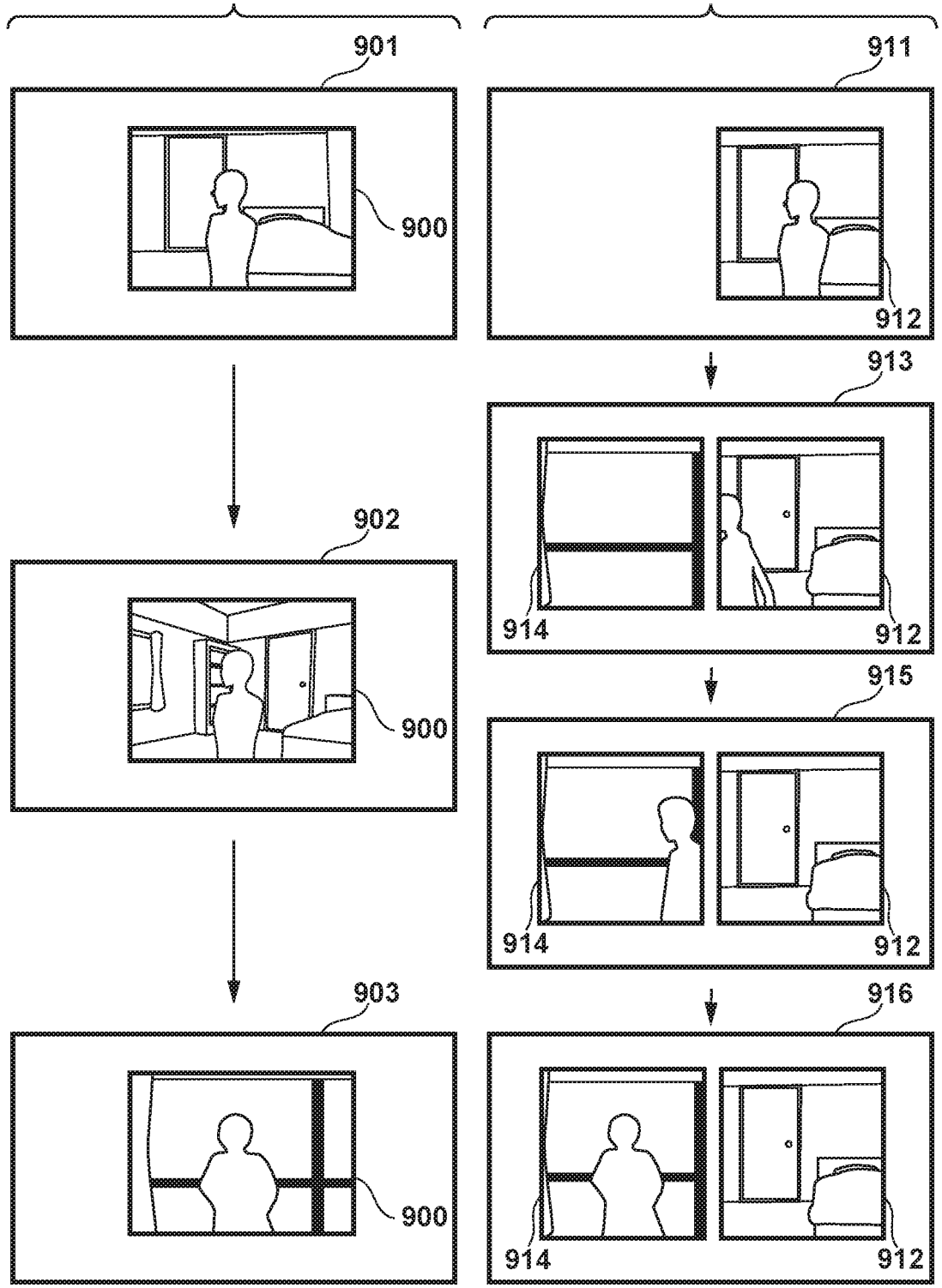

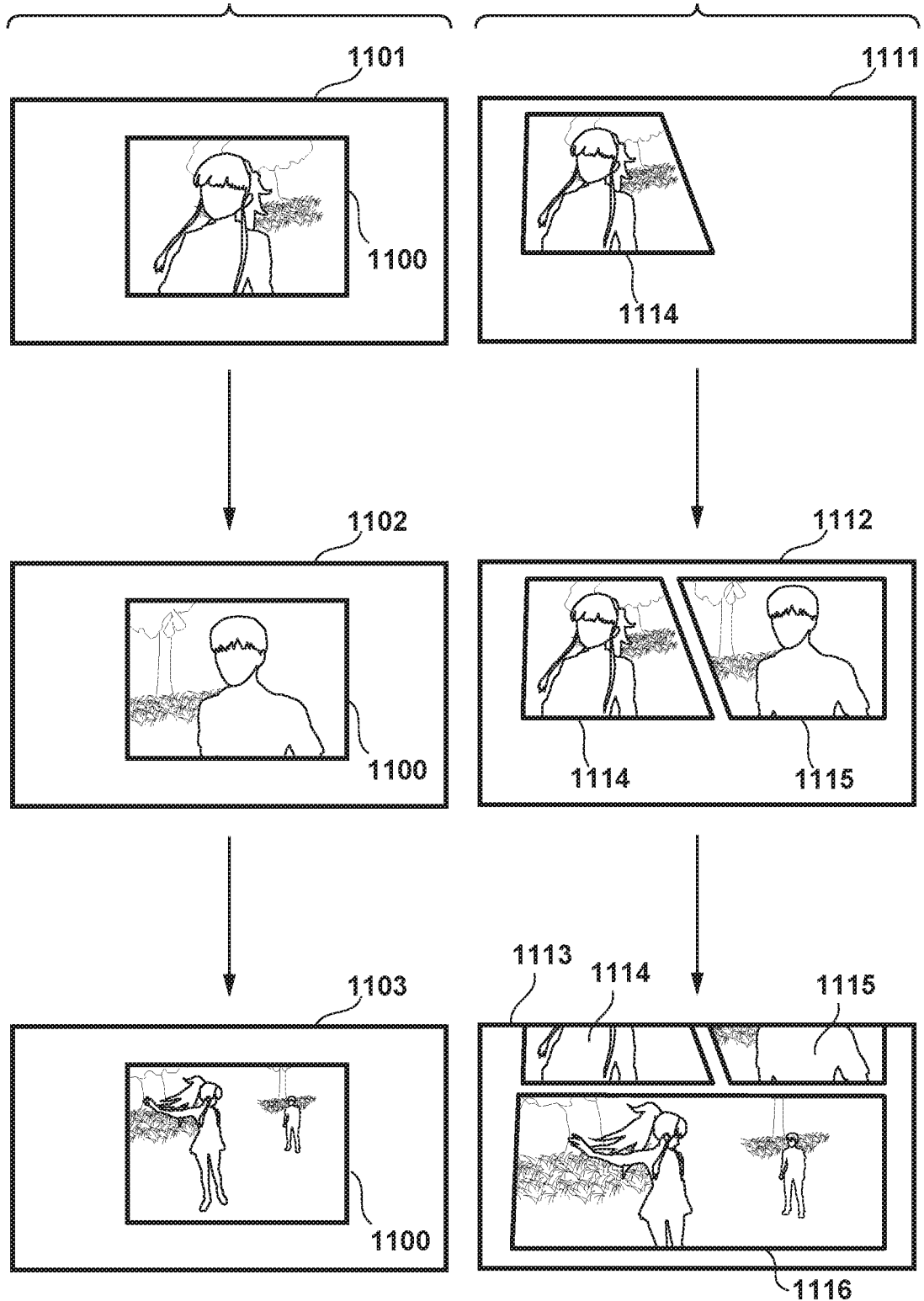

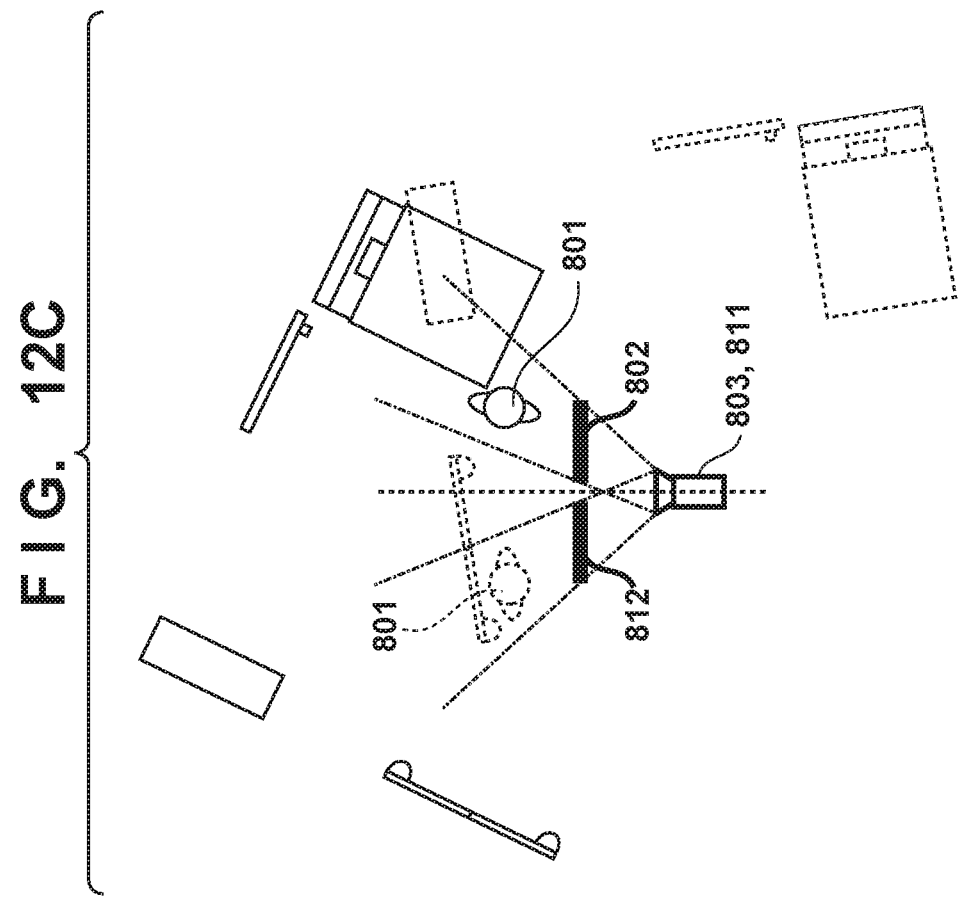
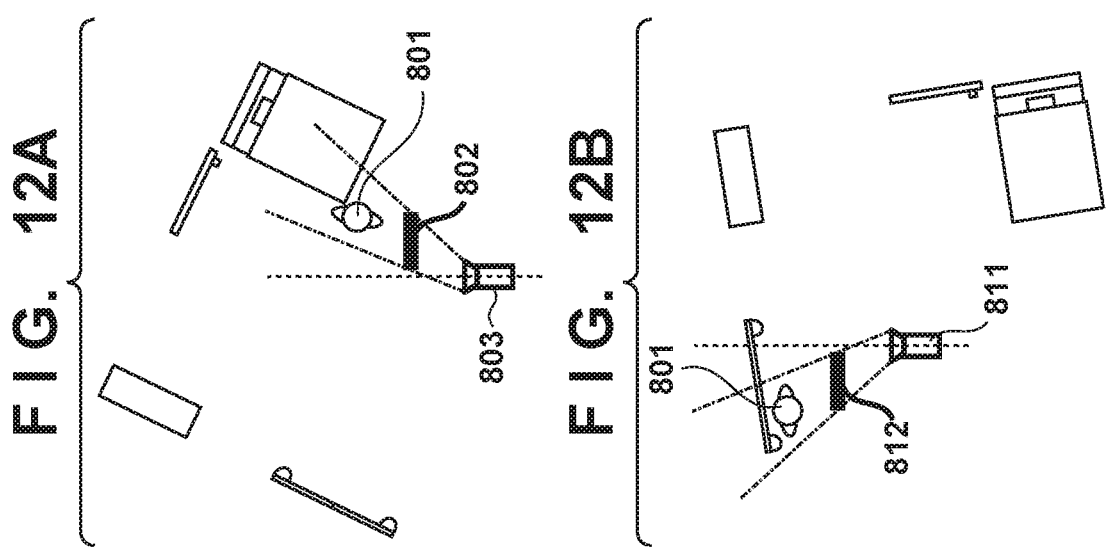

RECORDING MEDIUM, IMAGE GENERATION APPARATUS, AND IMAGE GENERATION METHOD

BACKGROUND OF THE INVENTION

Field of the Invention

The present invention relates to a recording medium, an image generation apparatus, and an image generation method, and particularly to a method for generating an image that is viewed in a binocular stereoscopic view.

Description of the Related Art

Owing to advances in virtual reality (hereinafter, simply "VR") technology, there are devices that enable binocular stereoscopic content to be viewed, such as head-mounted displays (HMDs) and dome displays. Such viewing devices employ a structure that cuts off visual information from the outside world by covering the field of view of a viewer to enhance immersion. In addition, the binocular stereoscopic content to be presented can also make a viewer feel more immersed by tracking physical movement, such as that of the positron of the head, face, and eyes, or the orientation of the viewer, and changing rendered content in accordance therewith (Japanese Patent Laid-Open No. 2016-192029). Recently, binocular stereoscopic viewing devices are also used in applications such as for gaming and watching movies.

To make the content such as that of games and movies more appealing, it is favorable to change (move or switch) viewpoints to follow story development.

However, in the case of providing such content in a binocular stereoscopic view, for example, it is difficult to express movement of a viewpoint to follow story development, such as moving across a large field, only by means of expression that corresponds to the physical movement of the viewer. That is to say, since a trackable area is limited, and in particular, an area in which physical movement can be made is restricted to a very small area in the case of a viewing device for home use, if such physical movement is used as a reference, the appeal of the binocular stereoscopic content to be provided is also limited.

On the other hand, the binocular stereoscopic content can be made more appealing by moving the viewpoint based on an operational input made by a user, or by forcibly switching the viewpoint to follow story development. However, such a change in the viewpoint that deviates from physical movement may make a viewer feel unpleasant, and may cause so-called VR sickness due to vection or the like.

SUMMARY OF THE INVENTION

The present invention was made in view of such problems in the conventional technique. The present invention provides a recording medium, an image generation apparatus, and an image generation method for presenting binocular stereoscopic content in a mode that is favorable for a viewer, while ensuring that the presentation is appealing.

The present invention in its first aspect provides a non-transitory computer-readable recording medium storing a program, the program causing a computer that generates a binocular stereoscopic image associated with content to execute: acquisition processing for acquiring information regarding movement of a viewpoint of a viewer; and generation processing for rendering and generating left-eye and right-eye images for a binocular stereoscopic view corresponding to the movement of the viewpoint of the viewer, wherein, in the generation processing, a first region in which an element to be stereoscopically perceived is rendered in accordance with the movement of the viewpoint of the viewer is restricted to a portion of each of the left-eye and right-eye images, and the element to be stereoscopically perceived is not rendered in a second region that is a region other than the first region.

The present invention in its second aspect provides an image generation apparatus that generates a binocular stereoscopic image associated with content, the apparatus executes a program to cause at least one processor to function as: acquisition means for acquiring information regarding movement of a viewpoint of a viewer; and generation means for rendering and generating left-eye and right-eye images for a binocular stereoscopic view corresponding to the movement of the viewpoint of the viewer, wherein the generation means restricts a first region in which an element to be stereoscopically perceived is rendered in accordance with the movement of the viewpoint of the viewer to a portion of each of the left-eye and right-eye images, and does not render the element to be stereoscopically perceived in a second region that is a region other than the first region.

The present invention in its third aspect provides an image generation method for generating a binocular stereoscopic image associated with content, the method comprising: acquiring information regarding movement of a viewpoint of a viewer; and rendering and generating left-eye and right-eye images for a binocular stereoscopic views corresponding to the movement of the viewpoint of the viewer, wherein, during the generating, a first region in which an element to be stereoscopically perceived is rendered in accordance with the movement of the viewpoint of the viewer is restricted to a portion of each of the left-eye and right-eye images, and the element to be stereoscopically perceived is not rendered in a second region that is a region other than the first region.

Further features of the present invention will become apparent from the following description of exemplary embodiments (with reference to the attached drawings).

BRIEF DESCRIPTION OF THE DRAWINGS

FIG. 3 is a flowchart illustrating an example of image generation processing performed by the PC 100 according to the embodiments of the present invention and the modifications.

FIGS. 9A and 9B illustrate examples of images generated due to the representation with viewpoint movement according to the third embodiment of the present invention.

FIGS. 11A and 11B illustrate examples of images generated due to representation with viewpoint switching according to the third embodiment of the present invention.

FIGS. 12A, 12B and 12C illustrate a rendering method according to the third embodiment of the present invention.

DESCRIPTION OF THE EMBODIMENTS

First Embodiment

Hereinafter, exemplary embodiments of the present invention will be described in detail with reference to the drawings. Note that the following embodiments will be described regarding an example in which the present invention is applied to a PC that serves as an example of an image generation apparatus and is able to generate binocular stereoscopic images corresponding to movement of a viewpoint. However, the present invention is applicable to any device that is able to generate binocular stereoscopic images corresponding to movement of a viewpoint. In this specification, it is assumed that "rendering viewpoint" refers to a viewpoint that is actually used in processing to render a region in which an element to be stereoscopically perceived is presented in a binocular stereoscopic image.

Configuration of Content Presentation System

Figure 1:
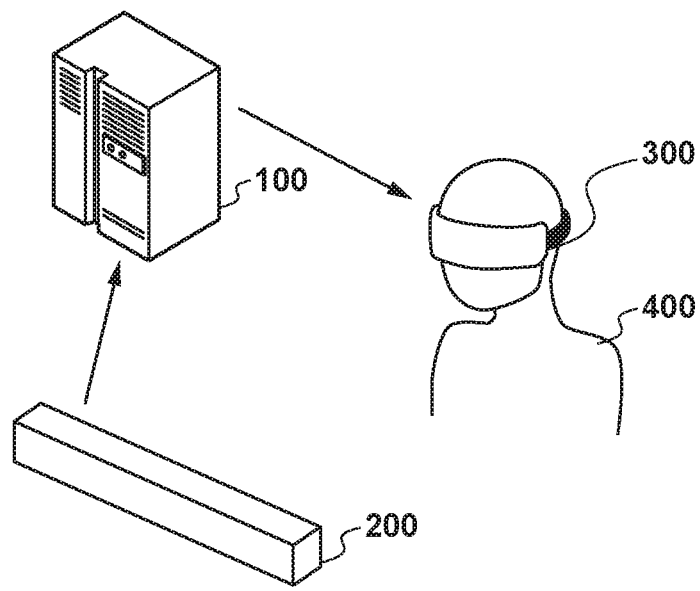
FIG. 1 shows a configuration of a content presentation system according to embodiments of the present invention and modifications.

FIG. 1 is a system diagram showing a configuration of a content presentation system according to this embodiment.

As shown in FIG. 1, in the content presentation system according to this embodiment, an HMD 300 is used to present, to a viewer, a binocular stereoscopic image in provided content. The HMD 300 includes a display device (not shown), and presents a left-eye image or a right-eye image to a corresponding eye of a person (viewer 400) wearing the HMD 300. The display device does not need to be provided for each of the left eye and right eye, and may also be configured so that a display region is divided to display a left-eye image and a right-eye image, and corresponding images are guided to the respective eyes by using a Fresnel lens or the like.

A tracking sensor 200 is a sensor for detecting movement (movement and change in orientation) of the head (viewpoint) of the viewer 400, in an image capturing apparatus that is constituted by two optical systems, for example. In this embodiment, movement of the head of the viewer 400 is detected based on a marker (not shown) provided in the HMD 300 worn by the viewer 400, and the tracking sensor 200 outputs the detection results to a PC 100. The PC 100 determines a rendering viewpoint for a binocular stereoscopic image to be presented to the viewer 400, based on the results of movement detection of the head that are thus input to the PC 100.

Note that, although it is assumed in the description of this embodiment that movement of a viewpoint of the viewer 400 is detected using the tracking sensor 200, it will be appreciated that implementation of the present invention is not limited thereto. That is to say, rather than a mode of detecting movement of a viewpoint based on an external sensor as in this embodiment, a mode may also be employed in which, for example, the HMD 300 includes an azimuth sensor, an acceleration sensor, a gyroscope sensor, or the like, and the detection results obtained thereby are output to the PC 100, or a mode may also be employed in which movement of a viewpoint is detected using any other method.

Also, although the content presentation system according to this embodiment will be described while assuming that the system uses the HMD 300 that presents the binocular stereoscopic image while covering the eyes of the viewer 400 to enhance immersion, this is merely an example, and it will be readily appreciated that any other apparatuses may present the image when the present invention is implemented. That is to say, to present the binocular stereoscopic image, any kind of apparatus may be used as long as the apparatus allows the viewer to view content in a binocular stereoscopic view by providing disparity images to the left and right eyes of the viewer 400.

Although this embodiment will be described while assuming that the content presentation system is constituted by the PC 100, the tracking sensor 200, and the HMD 300, implementation of the present invention is not limited to a mode in which these members are separate. For example, a similar viewing experience can be provided to a viewer by presenting a binocular stereoscopic image in a mode of dividing a display region in a display device provided in a device that is configured to be able to detect its own position and orientation using an acceleration sensor, a gyroscope sensor, or the like, and using dedicated head-mounted equipment. That is to say, the functions of rendering a binocular stereoscopic image, presenting the rendered binocular stereoscopic image, and detecting movement of a viewpoint of the viewer may also be realized by a single apparatus, or may also be realized by dividing these functions between a plurality of other apparatuses.

The PC 100 provides the binocular stereoscopic image to the HMD 300. As mentioned above, the PC 100 renders a binocular stereoscopic image is provided content for a rendering viewpoint that corresponds to movement of a viewpoint of the viewer, based on the detection results from the tracking sensor 200, and sequentially outputs the rendered binocular stereoscopic image.

Functional Configuration of PC 100

Figure 2:
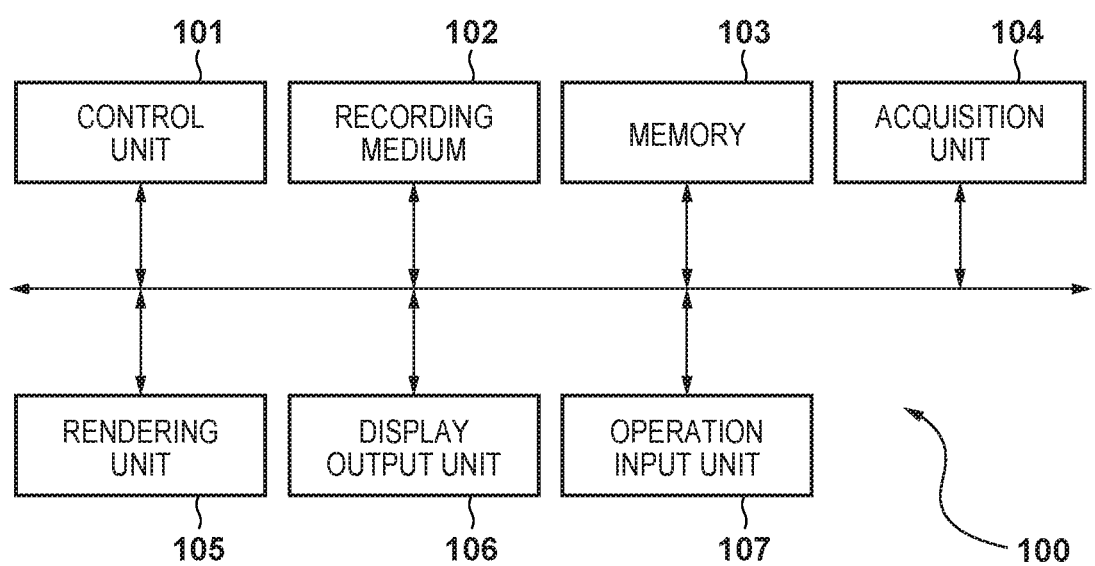
FIG. 2 is a block diagram showing a functional configuration of a PC 100 according to the embodiments of the present invention and the modifications.

Here, the details of a functional configuration of the PC. 100 will be described using the block diagram in FIG. 2.

A control unit 101 is a CPU, for example, and controls operations of blocks provided in the PC 100. The control unit 101 controls operations of the blocks by reading out operation programs for the respective blocks stored in a recording medium 102, loading the read operation programs to a memory 103, and executing them.

The recording medium 102 is a nonvolatile recording apparatus, which may be a built-in, rewritable ROM, or an optical disk that can be read via an HDD or an optical drive, for example, provided in the PC 100, for example. The recording medium 102 records information, such as that of various kinds of parameters, required for the operations of each block, as well as the operation programs for the blocks. Various kinds of data that is related to content (provided content) that is to be viewed in a binocular stereoscopic view by the viewer in the content presentation system according to this embodiment are also stored in the recording medium 102. The memory 103 is a volatile memory, for example, and is also used as an area for temporarily storing intermediate data that is output while the blocks and the like are operating, as well as an area to which the operation programs for the blocks are loaded.

An acquisition unit 104 is an interface for acquiring information regarding the result (movement detection result) of detecting movement of a viewpoint of the viewer that is input by the tracking sensor 200. Upon acquiring the information regarding the movement detection result, the acquisition unit 104 converts the acquired information to information in an appropriate format if necessary, and stores it in the memory 103.

A rendering unit 105 generates left-eye and right-eye images to be displayed on the HMD 300, based on the movement detection result stored in the memory 103 by the acquisition unit 104. In the content presentation system according to this embodiment, the left-eye and right-eye images for binocular stereoscopic view are generated by rendering a group of elements (rendering objects) to be stereoscopically perceived that are arranged in a three-dimensional space, for left-eye and right-eye rendering viewpoints, which are defined corresponding to viewpoints of the viewer.

A display output unit 106 is an interface for outputting the left-eye and right-eye images that are generated by the rendering unit 105 to the HMD 300. The format of display output may be selected in accordance with the configuration of the HMD 300, and the display output unit 106 converts these images to images in an appropriate format if necessary, and outputs the images. In this embodiment, basically, the left-eye and right-eye images that correspond to the viewpoints of the viewer 400 are presented to the viewer 400 via the HMD 300, although there is a slight time lag in measurement and rendering.

An operation input unit 107 is a user interface of the PC 100, and is, for example, a controller, a glove-type device, or the like. Upon detecting that an operation input has been made by the viewer 400, the operation input unit 107 outputs a control signal that corresponds to this operation input to the control unit 101.

Image Generation Processing

A description will now be given, using the flowchart in FIG. 3, of specific image generation processing for generating a binocular stereoscopic image executed by the PC 100 according to this embodiment that has the above-described configuration. The processing that corresponds to this flowchart can be realized as a result of, for example, the control unit 101 reading out a corresponding processing program stored in the recording medium 102, loading the processing program to the memory 103, and executing it. Note that, in the following description, this image generation processing starts when an application for viewing the provided content is started, and is executed for each frame of images output to the HMD 300, for example.

In step S301, the control unit 101 determines the positions at which rendering objects in the provided content are to be arranged in the three-dimensional space and controls the behavior of each rendering object, for a frame to be displayed (display frame). The controls of the arranged positions of the rendering objects and of the behavior thereof may be performed based on predetermined story development, a decision making program, or the like in the provided content.

In step S302, the control unit 101 determines the positions and directions of the rendering viewpoints for the left-eye and right-eye images, based on the movement detection result received in association with the display frame. In the content presentation system according to this embodiment, to ensure visual presentation corresponding to physical movement of the viewer 400, the amounts of change in the position and direction of a rendering viewpoint that have been made from the previous frame are determined as the same as the movement and the amounts of change in the direction of a viewpoint of the viewer 400 from the previous frame to the display frame. Note that, to ensure the stability of visual representation, small changes in the values due to detection errors or the like may be absorbed through various kinds of smoothing processing.

In step S303, the control unit 101 determines whether or not an element to be stereoscopically perceived is contained in rendering areas that have been determined for the left-eye and the right-eye rendering viewpoints. In this embodiment, the area in which disparity that corresponds to the distance in a depth direction is perceived when an area to be stereoscopically perceived, i.e. the left-eye and right-eye images are viewed while viewing the provided content in a binocular stereoscopic view, is limited to a partial area that is narrower than a viewing area presented to the viewer 400. Thus, even if representation with viewpoint movement that deviates from physical movement of the viewer 400 is generated, an unpleasant feeling that is caused thereby is reduced, while reducing vection generated due to movement in a peripheral field of view in the provided content.

Element to be Stereoscopically Perceived

Here, the details of an element to be stereoscopically perceived by the viewer 400 will be described with reference to the drawings.

Figure 4A:
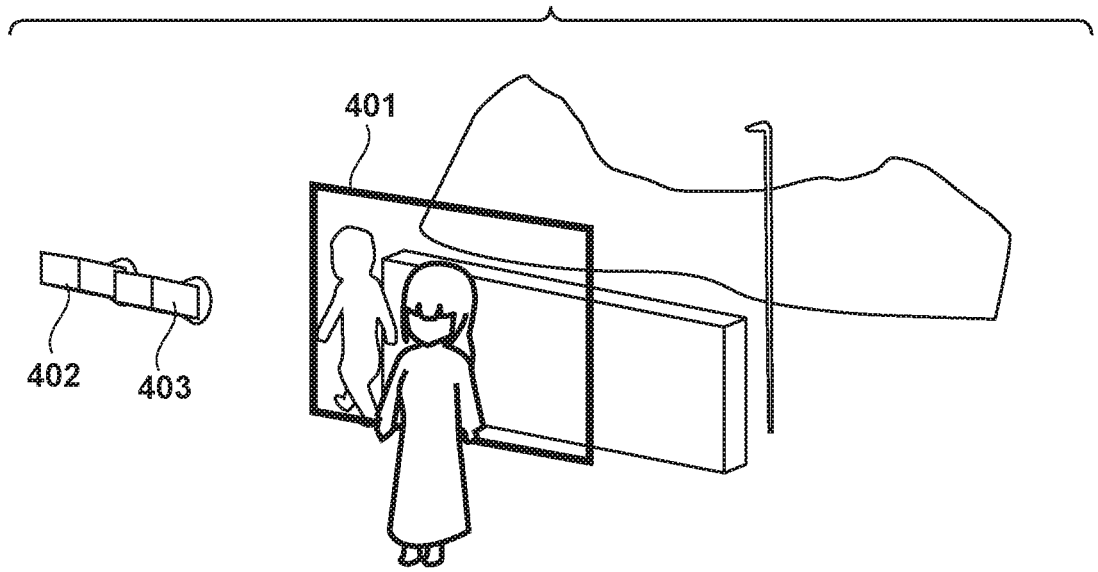
FIGS. 4A and 4B illustrate an element to be stereoscopically perceived according to a first embodiment of the present invention.

The content presentation system according to this embodiment uses a frame object 401, which is a plate-shaped object shown in FIG. 4A, so that only a partial region in the image presented on the HMD 300 is stereoscopically perceived. The frame object 401 is held at a fixed position in the three-dimensional space regardless of movement of the viewpoints of the viewer 400 or development of the provided content, and appears on the left-eye and right eye images so as to be stereoscopically perceived by the viewer 400 by being rendered for left-eye and right-eye rendering viewpoints 402 and 403. Basically, the size of the frame object 401 and the position at which the frame object 401 is arranged (or the separation distance from the rendering viewpoints) are determined so as not to occupy the entire area viewed by the viewer 400 while viewing in a binocular stereoscopic view. Note that the frame object need not be used for the purpose of directly developing the story of the provided content, and is used in this embodiment for the purpose of favorably leading the viewpoint of the viewer to an element to which attention is to be paid in the provided content, or effectively representing such an element.

Figure 4B:
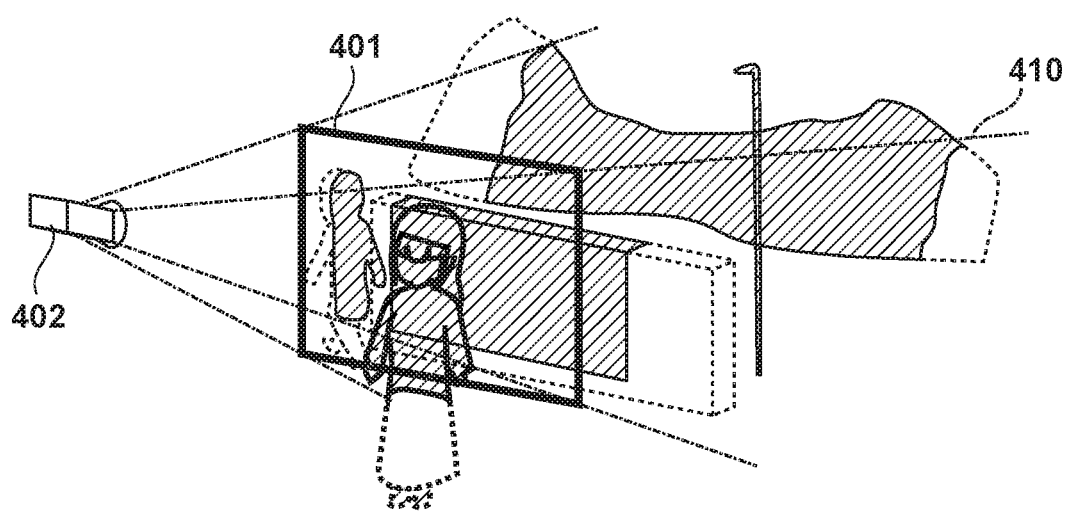

Rendering objects (content objects) of elements such as a character and the background that directly develop the story of the provided content are arranged in the three-dimensional space, but are configured to be able to be viewed only via the frame object. In other words, the viewer 400 can view these content objects via the frame object that is similar to a window. Specifically, as for the left-eye rendering viewpoint 402, objects included in a cone area 410 that is defined by the rendering viewpoint 402 and the frame object 401 (only hatched portions included in the area), among content objects arranged in the three-dimensional space, are rendered in the left-eye image as shown in FIG. 4B, and are presented to the viewer 400.

Figure 5:
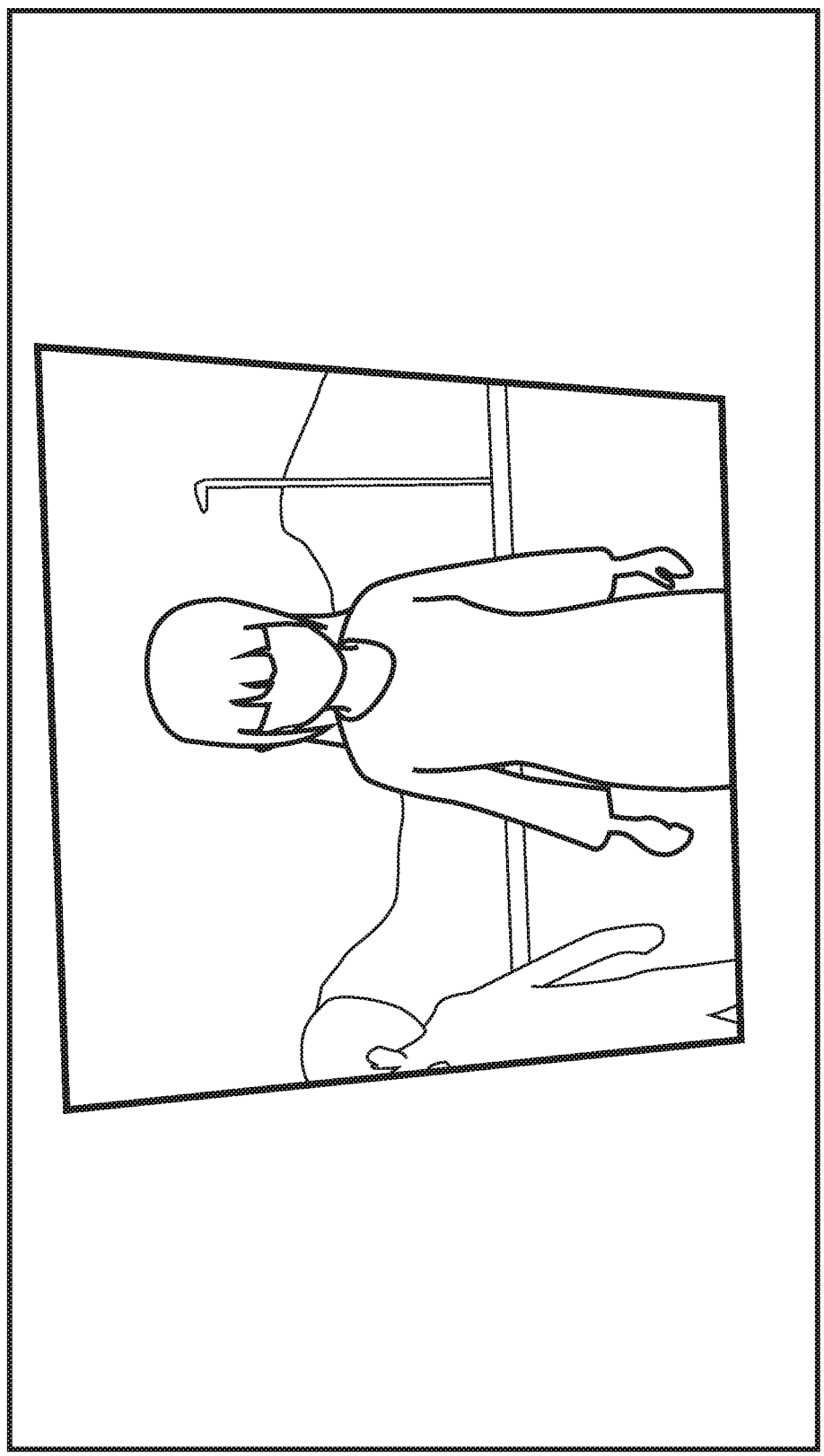
FIG. 5 shows an example of a generated image according to the first embodiment of the present invention.

To enable the content objects to be viewed only within the area of this frame object 401, in this embodiment, the rendering unit 105 generates the left-eye image shown in FIG. 5 by rendering the content objects in the cone area 410 using a method of projecting the content objects onto a predetermined viewing plane of the frame object 401 that is a plate-shaped object. That is to say, the front-rear relationship between the content objects expressed in the cone area is projected to and rendered on points on straight lines connecting (or extension lines connecting) the left-eye rendering viewpoint 402 and the objects, the point on which these lines intersect with the viewing plane of the frame object 401. For this reason, with the generated left-eye and right-eye images, the viewer 400 can stereoscopically perceive the frame object 401, and view the stereoscopic expression of the provided content in association with movement of the viewpoints and movement of the content objects in (the area of) the viewing plane of the frame object 401.

On the other hand, objects (or portions) that are not included in the cone area 410 are not projected to the frame object 401, and do not appear in the binocular stereoscopic image. In this embodiment, as mentioned above, the elements to be stereoscopically perceived are not rendered in the region other than the frame object 401 in the image, and a plain image is rendered in the other area as shown in FIG. 5 in order to reduce vection generated due to movement in the peripheral field of view. Thus, even if a binocular stereoscopic view is generated using the left-eye and right-eye images, the viewer 400 does not perceive movement or disparity since there is no object rendered in the plain region, and the viewer 400 can accordingly continue to favorably view the image.

For this reason, in step S303, the control unit 101 determines whether or not so-called "rendering calculation" associated with the content objects and frame object needs to be performed for the left-eye and right-eye images. If the control unit 101 determines that an element to be stereoscopically perceived is contained in the rendering areas determined for the left-eye and right-eye rendering viewpoints, the control unit 101 advances the processing to step S304. If the control unit 101 determines that no element to be stereoscopically perceived is contained in the rendering areas determined for the left-eye and right-eye rendering viewpoints, the control unit 101 advances the processing to step S306 and generates plain images as the left-eye and right-eye images. Note that, in a simple manner, the determination in this step may be performed based on whether or not the frame object is included in the rendering areas (fields of view) determined for the viewpoints.

In step S304, the rendering unit 105 renders the region associated with the frame object for the images for the respective eyes. As mentioned above, in this embodiment, since rendering is performed using the method of projecting the elements to be stereoscopically perceived on the viewing plane side of the frame object, the rendering unit 105 renders, in the processing in this step, the frame object and the content objects contained in the cone area defined based thereon, for the rendering viewpoints for the respective eyes.

In step S305, the rendering unit 105 renders predetermined plain images (fills pixels with a plain color) in regions that were not rendered in step S304, and generates the left-eye and right-eye images.

In step S307, the display output unit 106 outputs the left-eye and right-eye images generated by the rendering unit 105 to the HMD 300 under the control of the control unit 101, and finishes this image generation processing for the display frame.

With this configuration, the image generation apparatus according to this embodiment can present binocular stereoscopic content in a mode that is favorable for the viewer, while ensuring that the presentation is appealing. More specifically, by performing control so that an element to be stereoscopically perceived is rendered in a stereoscopically perceivable state only in a partial region of the viewing area, and an element to be stereoscopically perceived is not rendered in the other region, a visually unpleasant feeling that may occur during viewing can be reduced, while leading the viewpoint of the viewer in the direction in which attention is to be paid.

Second Embodiment

In the above-described first embodiment, an element to be stereoscopically perceived is rendered using the method of projecting this element onto the viewing plane of the frame object that is a plate-shaped object, and the region to be stereoscopically perceived by the viewer 400 is restricted, thereby providing favorable viewing experience. Meanwhile, regarding the viewing in a binocular stereoscopic view, content that allows a viewer to look around in all directions is also appealing, and it is also conceivable that, in a mode in which the region to be stereoscopically perceived is restricted in the sense of looking through a window which is the case with the frame object, the viewer 400 wants an omnidirectional viewing experience in which the viewer 400 looks out from a window in order to further feel a sense of immersion.

However, in the case of the method of projecting content objects onto the viewing plane of the frame object, the content objects are presented so as to be able to be stereoscopically perceived without collapsing when a rendering viewpoint is located on the proximal side relative to the viewing plane, but the content objects projected onto the viewing plane cannot be presented when the rendering viewpoint is located on the distal side relative to the viewing plane, i.e. in a situation where the frame object is present rearward of (behind) the rendering viewpoint. For this reason, even if, for example, the viewer 400 wants an omnidirectional binocular stereoscopic view of a scene of the provided content presented in the frame object, and performs an operation to simply bring a rendering viewpoint closer to the viewing plane from the viewing plane side of the frame object, the frame object is not rendered when the rendering viewpoint moves from the viewing plane side to the non-viewing plane side (to be exact, when a near clipping plane that is set for the viewpoint has moved from the viewing plane side to the non-viewing plane side), and the content objects cannot be viewed either.

Accordingly, to provide a viewing experience desired by such a viewer, in this embodiment, in the case where movement of the viewpoint of the viewer 400 has occurred so that the rendering viewpoint moves through a plane defined by the frame object from the viewing plane side to the non-viewing plane side, this movement of the viewpoint triggers switching of the rendering method to an omnidirectional rendering method that enables the three-dimensional space of the provided content to be viewed in a binocular stereoscopic view. That is to say, when the rendering viewpoint moves through the viewing plane to the non-viewing plane side, the rendering method is switched from a mode of restricting presentation of an element to be stereoscopically perceived using the method of projecting the element to the viewing plane to a partial region of the viewed area, to a mode of not restricting presentation. In other words, when the rendering viewpoint is located in an area in which the viewing plane of the frame object can be viewed, content objects contained in the cone area defined by the frame object and the rendering viewpoint are rendered using the method of projecting the content objects onto the viewing plane of the frame object, and a binocular stereoscopic image is generated. On the other hand, when the rendering viewpoint has passed through the area of the plane defined by the frame object and is located in an area in which the viewing plane cannot be viewed, content objects included in the field of view of the rendering viewpoint, including a content object that is not contained in the cone area and accordingly has not been presented, are rendered, while not using the method of projecting the content objects onto the viewing plane, and a binocular stereoscopic image is generated. In the case of not restricting presentation using the frame object, the three-dimensional space can be omnidirectionally viewed in binocular stereoscopic view by changing the rendering viewpoint as in the conventional technique, and therefore, the rendering viewpoint may also be moved based only on physical movement of the viewer 400 so as to provide a favorable viewing experience.

Figure 6A:
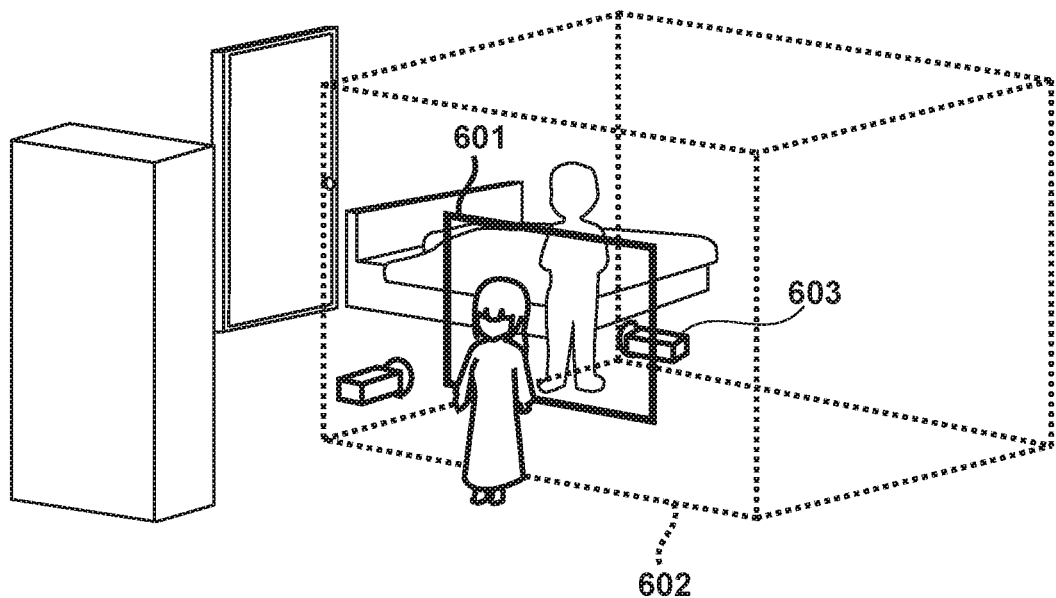
FIGS. 6A and 6B illustrate an element to be stereoscopically perceived according to a second embodiment of the present invention.
Figure 7:
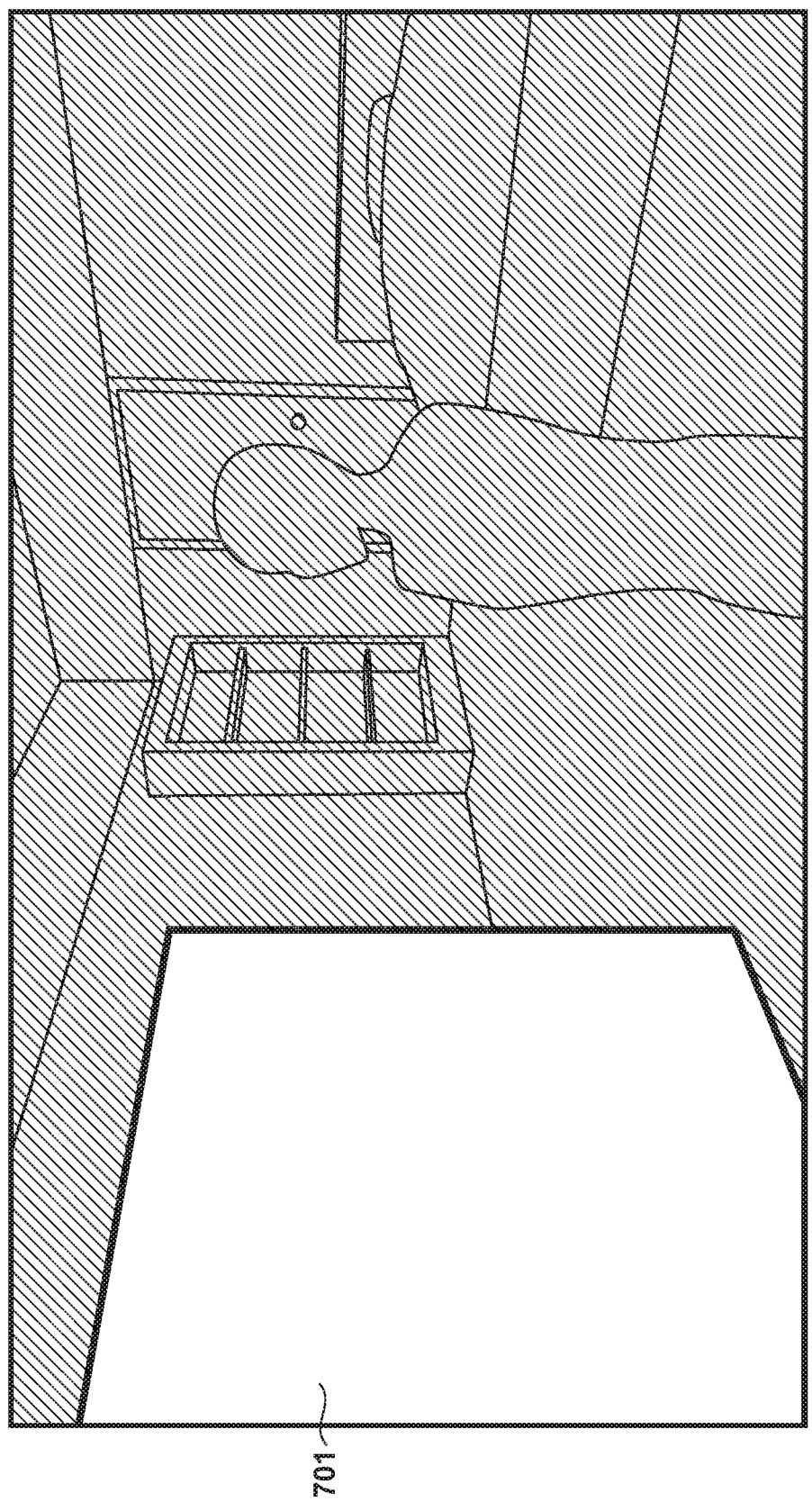
FIG. 7 shows an example of a generated image according to the second embodiment of the present invention.

Note that, in the above description of this embodiment, when the rendering viewpoint passes through the plane formed by the frame object from the viewing plane side to the non-viewing plane side, the rendering mode is switched from the mode of restricting presentation of an element to be stereoscopically perceived in the provided content to a partial region of the viewing area to the non-restricting mode, but implementation of the present invention is not limited thereto. For example, as shown in FIG. 6A, a configuration may also be employed in which the frame object 601 is configured to act like a window into which the viewer 400 can look, and a method is used in which a content object that is present apart from the frame object (that is present on non-viewing plane side) is projected onto an inner wall face of a predetermined room-like space 602 that is provided on the non-viewing plane side, and thus, a similar viewing experience can be seamlessly provided without switching the rendering method. In this case, the space on the viewing plane side seen from the inside (non-viewing plane side) of the window (frame object 601) is a plain space, and therefore, necessarily the binocular stereoscopic viewing cannot be performed omnidirectionally, and this plain space may also be contained depending on the position of the rendering viewpoint or the orientation. For example, in an image rendered for a rendering viewpoint 603, a content object that cannot be viewed from the viewing plane side is contained, whereas a plain region 701 associated with a space on the viewing plane side is rendered, as shown in FIG. 7. For this reason, in the mode configured as shown in FIG. 6A, when the rendering viewpoint has entered the inner side of the window, rather than being located on the outer side, a state is entered where restriction on an element to be stereoscopically perceived in the provided content in the viewing area, i.e. restriction using the frame object 601 is reduced.

Figure 6B:
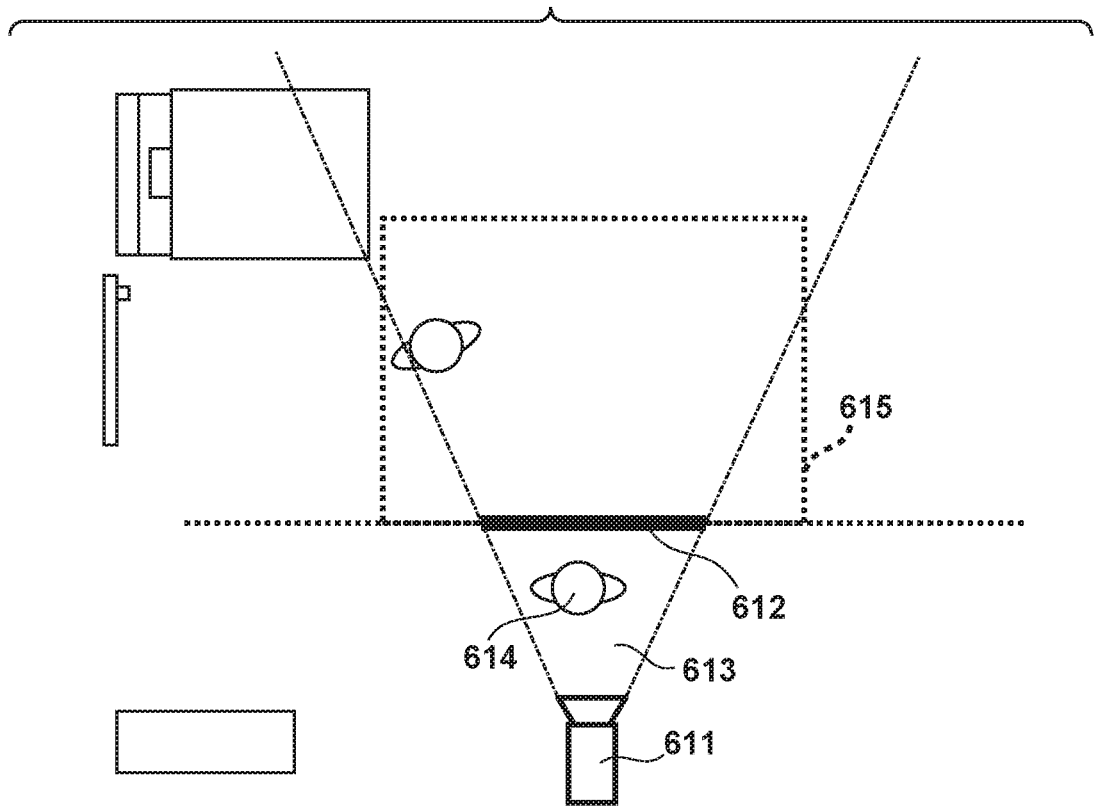

In the example in FIG. 6A, an example has been described in which no content object to be stereoscopically perceived is present on the viewing plane side of the frame object, for simplification, but if a content object to be stereoscopically perceived is present as in FIG. 6B, the following control may be performed, for example. In the case where a content object 614 that is contained in a cone area 613 is present between a rendering viewpoint 611 and a frame object 612 (i.e. on the viewing plane side) as shown in FIG. 6B, the content object 614 may be projected onto and rendered on the viewing plane of the frame object 612, and content objects that are present on the non-viewing plane side may be projected onto the inner wall face of a space 615, similarly to FIG. 6A. In this case, when the rendering viewpoint passes through the viewing plane of the frame object 612 and enters the space 615, or when the rendering viewpoint moves closer to the viewing plane than to the content object 614, control may be performed so as not to project the content object 614 onto the viewing plane.

Note that, in this embodiment, the rendering viewpoint changes as mentioned above as a result of movement of the viewer 400, but the present invention is not limited thereto, and for example, it is needless to say that the aforementioned transition may also occur as a result of a positional relationship between the rendering viewpoint and the frame object changing due to an operation input to draw the frame object closer being made.

Thus, with the content presentation system according to this embodiment, the mode of presenting binocular stereoscopic content can be changed from a state where a presentation region to be stereoscopically perceived is restricted to a state where the restriction is reduced, in accordance with a request from the viewer, and accordingly, this embodiment may also be used as a portal of binocular stereoscopic content, for example, regardless of developments in the story or the like.

Third Embodiment

In recent years, binocular stereoscopic interactive content that is provided for household viewing devices or the like and for which typical omnidirectional viewing is envisioned is configured to realize viewing at a desired viewpoint of a viewer while avoiding viewpoint movement that deviates from physical movement of the viewer, as mentioned above.

Meanwhile, there may also be cases where representation with viewpoint movement or representation with viewpoint switching is favorable for viewing, depending on the provided content. For example, in content such as that of a comic or a picture book, the reader is effectively led to a point to which attention is to be paid by moving or switching the viewpoint on each segment or page, and thus representation that increases the appeal of story development is performed. In the case of sublimating such content to an omnidirectional, binocular stereoscopic one, it is difficult to lead the line of sight of the viewer to a point to which attention is to be paid, without forcibly moving or switching the viewpoint in a manner that deviates from physical movement of the viewer.

This embodiment will describe a method for favorably providing representation with viewpoint movement or representation with viewpoint switching in binocular stereoscopic content, by arranging a plurality of frame objects and presenting content objects associated with different viewpoints via these frame objects. Note that, even in the mode in which one frame object is arranged and content objects are enabled to be viewed via this frame object as described in the above first and second embodiments, representation with viewpoint movement with a small amount of movement is less likely to inhibit favorable viewing of the viewer 400. However, in the mode of presenting elements to be stereoscopically perceived in a partial region of the viewing area, the amount of information with which the viewer 400 perceives the three-dimensional space in the provided content is naturally small, and accordingly, representation with viewpoint movement in which the amount of movement exceeds a certain amount and representation with viewpoint switching, that viewing is switched from a different viewpoint, may inhibit favorable viewing of the viewer 400. For this reason, this embodiment will describe a configuration in which a mode of arranging a plurality of frame objects are arranged is employed to favorably provide such representation to the viewer 400.

Viewpoint Representation

A description will be gives below of an overview of a method for presenting representation with viewpoint movement and representation with viewpoint switching for provided content used in the content presentation system according to this embodiment. Note that, in the following description of viewpoint representation, for simplification, "rendering viewpoint" refers to a concept that indicates a position and an orientation regardless of whether the viewpoint is of the left eye or the right eye, or refers to a representative position and orientation for defining the left-eye and right-eye viewpoints, unless otherwise stated.

Figure 8A:
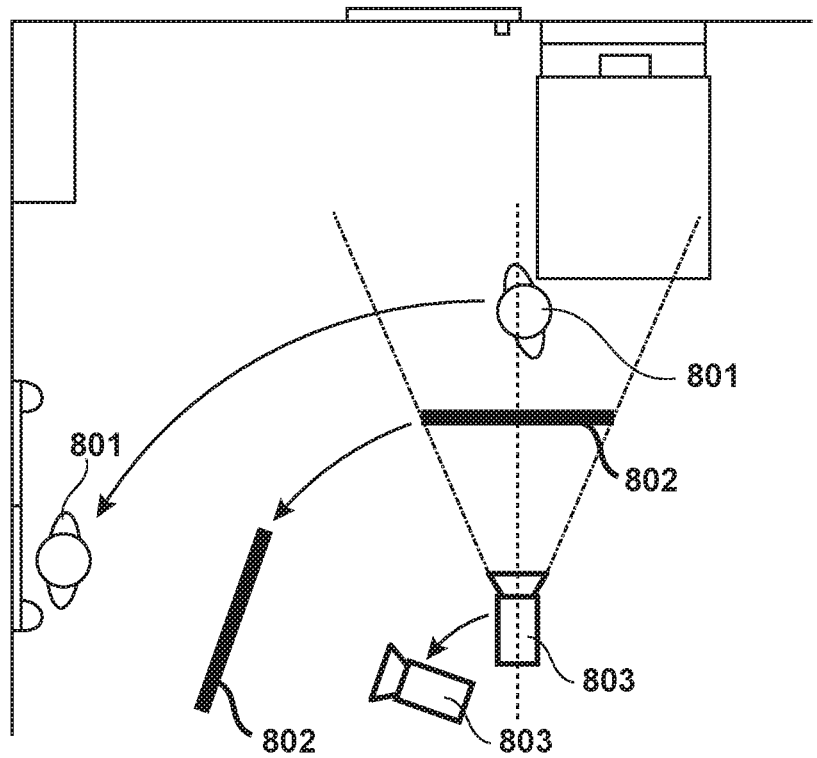
FIGS. 8A and 8B illustrate an example of representation with viewpoint movement according to a third embodiment of the present invention.

As an example of representation with viewpoint movement, representation will now be considered in which, when a character 801 moves out of a cone area associated with one frame object 802, the viewpoint pans so as to follow this movement, as shown in FIG. 8A. That is to say, in order to enable this character to be stereoscopically perceived, the frame object 802 and a rendering viewpoint 803 are controlled so as to move (turn) to capture the character at the center of the cone area defined for the rendering viewpoint 803. At this time, in a binocular stereoscopic image rendered for the rendering viewpoint 803, for example, the rendered content of the background that is rendered around the character 801 abruptly changes (transitions in the order from image 901 to 902, then to 903) as shown in FIG. 9A, which may consequently make the viewer 400 feel unpleasant. Here, a region 900 in all of the images 901, 902, and 903 rendered based on the rendering viewpoint 803 and the frame object 802 for which the aforementioned movement and orientation control are performed.

Figure 8B:
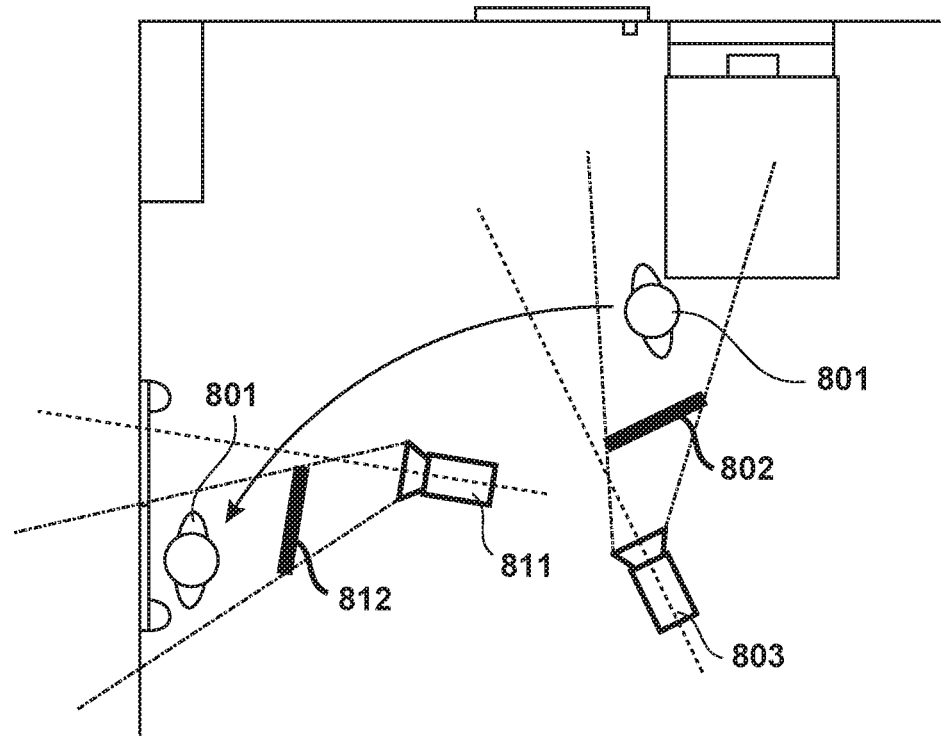

In order not to present such unfavorable representation with viewpoint movement, in the PC 100 according to this embodiment, a rendering viewpoint 811 and a frame object 812 for partially capturing a movement area of the character 801 is additionally provided separately from the rendering viewpoint 803, as shown in FIG. 8B, for example, and rendering control is performed so as to enable stereoscopic perception for each viewpoint.

As shown in the figures, an image of a region 912 of the frame object 802 within an image 911 shown in FIG. 9B is rendered so as to enable an area associated with the beginning of moving representation to be stereoscopically perceived, based on the rendering viewpoint 803 and the frame object 802 for capturing the character in the cone area before the movement. On the other hand, the additionally provided rendering viewpoint 811 and frame object 812 are defined in the three-dimensional space at a predetermined timing before or after the start of the representation of the moving character, and an image of a region 914 that appears in an image 913 and subsequent images (images 913, 915, and 916 in this order) shown in FIG. 9B to which the image 911 transitions, are rendered in order to enable the area associated with the final stage of the moving representation to be stereoscopically perceived.

By thus using a plurality of frame objects, favorable representation with viewpoint movement can be presented without following all movements, by presenting images for two kinds of rendering viewpoints that partially follow movement of a character in a restricted region within the viewing area. That is to say, since a stereoscopic perception experience with a time difference between the frame objects is provided, even if movement between regions is not rendered, this movement is interpolated in the recognition of the viewer as in a comic, and an unpleasant feeling felt by the viewer 400 can be reduced.

Figure 10A:
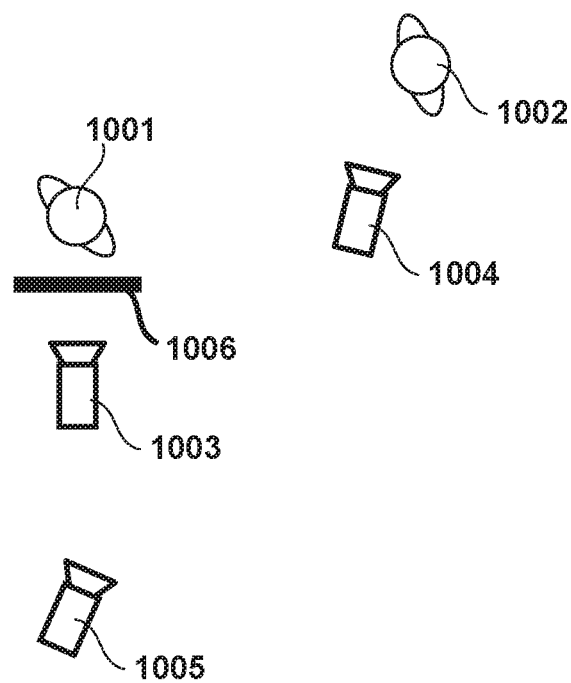
FIGS. 10A and 10B illustrate an example of representation with viewpoint switching according to the third embodiment of the present invention.

Next, as an example of representation with viewpoint switching, consideration will be given to presentation of a conversation scene between a character 1001 and a character 1002, in which the rendering viewpoint is switched between rendering viewpoints 1003 and 1004 at which the respective characters are rendered in a zoomed-in state and a rendering viewpoint 1005 at which both characters are rendered in a zoomed-out state, as shown in FIG. 10A. At this time, assuming rendering is performed while sequentially changing the position of a frame object 1006 in accordance with the rendering viewpoint to be used, as shown in FIG. 10A, even if the region in the viewing area in which elements to be stereoscopically perceived is presented is restricted, a main subject (a character to be stereoscopically perceived) as well as the distance between the main subject and the rendering viewpoint may abruptly change (transition from the image 1101 to 1102, then to 1103) in that region (region 1100), as shown in FIG. 11A, which may also result in making the viewer 400 feel unpleasant.

Figure 10B:
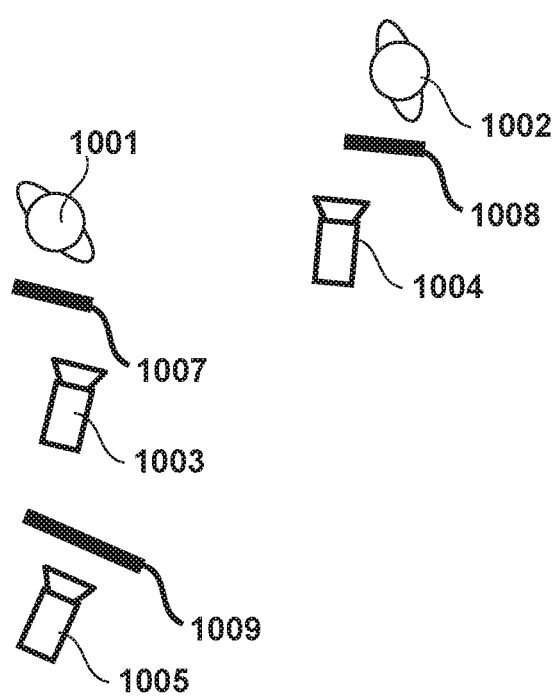

In order to avoid such unfavorable representation of viewpoint switching, in the PC 100 according to this embodiment, for example, frame objects 1007, 1008, and 1009 are provided for the respective rendering viewpoints as shown in FIG. 10B, and rendering control is performed so that areas in which stereoscopic perception is enabled for the respective viewpoints are sequentially presented in the viewing area.

As shown in the diagram, to enable content objects in the respective cone areas to be stereoscopically perceived based on the rendering viewpoints and frame objects that are sequentially selected in the order determined by the story development, during the transition from an image 1111 to 1112, then to 1113, areas 1114, 1115, and 1116 that correspond to the frame objects 1006, 1007, and 1008, respectively, are sequentially added to the viewing area, as shown in FIG. 11B. Accordingly, images for a plurality of rendering viewpoints associated with a change in viewpoint representation are presented in a restricted area in the viewing area by thus using a plurality of frame objects, and it is then possible to suppress abrupt switching of rendered content in the same area, and present favorable representation with viewpoint switching.

In this manner, in the case where representation with viewpoint movement or representation with viewpoint switching that involves a predetermined amount of movement or amount of change is performed on the provided content, the content presentation system according to this embodiment presents representation effects such as that of movement in a stereoscopically perceivable manner via the plurality of frame objects. More specifically, by dividing content to be represented and presenting the divided content with a time lag, for example, so that the amounts of movement of the viewpoints presented via the respective frame objects are smaller than or equal to a predetermined allowable amount, equivalent representation effects can be provided while reducing visual influence that may make the viewer 400 feel unpleasant.

Note that a plurality of frame objects and the content objects that are projected onto and presented on the viewing plane of these frame objects may also be switched and presented in a stereoscopically perceivable manner in accordance with movement of the viewpoint of the viewer 400, similarly to the above-described embodiment. Such an increase in the number of frame objects associated with presentation effects is not limited to an increase that is predetermined for viewing, and may be realized in the case where, for example, an operation input associated with viewpoint movement has been made or corresponding representation has been detected in the provided content, by performing control so as to dynamically increase the number of frame objects in accordance therewith using the control unit 101.

Rendering Method

In the above example of the viewpoint representation, an overview has been described regarding a method in which a rendering viewpoint is defined for each frame object, and images associated with an area to be stereoscopically perceived that is rendered for the rendering viewpoint are ultimately combined to generate a binocular stereoscopic image. Although a binocular stereoscopic image that realizes the above-described effects can also be generated by using this method, in terms of rendering processing, this method may consume rendering resources corresponding to the number of paths and amount of combination processing in accordance with the number of rendering viewpoints, and as a result, a frame delay or the like that is not favorable for binocular stereoscopic content may occur.

For this reason, to reduce the number of paths for rendering processing, this embodiment employs a method in which images that enable content objects in different cone areas to be stereoscopically perceived are rendered for each of a plurality of frame objects, by means of rendering processing for only one rendering viewpoint for each of the left eye and the right eye. That is to say, a plurality of frame objects are rendered at one time in processing to render the left-eye and right-eye images to be presented to the viewer 400. More specifically, a positional relationship between a pair of left-eye and right-eye rendering viewpoints and the plurality of frame objects in the three-dimensional space is maintained, and content objects arranged in a cone area defined by the rendering viewpoint and each frame object are copied in the frame objects so as to obtain a consistent positional relationship.

That is to say, in the case of performing rendering for a combination of the rendering viewpoint 803 and the frame object 802 and a combination of the rendering viewpoint 811 and the frame object 812 as shown in FIG. 8B, the content objects in a camera coordinate system based on each viewpoint are arranged as shown in FIGS. 12A and 12B, respectively, and, to render them through rendering processing with one path (for the left eye and right eye), a method may be employed in which a relative positional relationship with the rendering viewpoint is maintained, and they are then integrated with the same three-dimensional space, thereby obtaining an image in FIG. 12C. That is to say, to perform rendering for the two rendering viewpoints 803 and 811 on one path, a content object group for at least one rendering viewpoint is copied and arranged in the three-dimensional space. Thus, the same content objects are arranged in the three-dimensional space, whereas content objects to be projected onto the viewing planes of the frame object 802 and the frame object 812 are only objects that are associated with the respective frame objects.

In the example in FIG. 12C, the content object group projected to the viewing plane of the frame object 802 are only the objects depicted with solid lines that are present in the relative positional relationship shown in FIG. 12A, and the content objects depicted with broken lines are in a masked state in rendering processing. On the other hand, the content object group projected onto the viewing plane of the frame object 812 are only the objects depicted with the broken lines that are present in the relative positional relationship shown in FIG. 12B, and the content objects depicted with the solid lines are in a masked state in rendering processing. In other words, in a configuration with the smallest number of paths in the rendering processing, each frame object is associated with the content objects that are projected onto the viewing plane of this frame object, and content objects that are not associated with the frame object are masked and are not rendered in processing (including projection) to render the frame object.

In this manner, even in the case of binocular stereoscopic content that includes representation with viewpoint movement or representation with viewpoint switching, the image generation apparatus according to this embodiment can limit the region to be stereoscopically perceived in the viewing area and present the content in a mode favorable for the viewer. More specifically, by dividing represented content between a plurality of frame objects, it is possible to reduce a visually unpleasant feeling that may inhibit the viewer 400 from readily recognizing the content, or that may make the viewer 400 sick, due to viewpoint movement or viewpoint switching. In addition, by dividing representation and presenting elements to be stereoscopically perceived while sequentially arranging different frame objects, the line of sight of the viewer can be favorably led to an element to which attention is to be paid.

First Modification

In the above-described third embodiment, in the mode of restricting the region in which content objects to be stereoscopically perceived are presented in the viewing region, favorable content provision is realized by further using a plurality of frame objects to separate representation, but implementation of the present invention is not limited thereto. For example, when visual representation, such as representation with viewpoint movement or representation with viewpoint switching, that deviates from physical movement of the viewer is detected while content configured so that a three-dimensional space can be omnidirectionally viewed in a binocular stereoscopic view in a three-dimensional space is presented, the rendering method may also be controlled so as to restrict a region in which elements to be stereoscopically perceived are presented to a partial region in the viewing region, using one or more frame objects. That is to say, in the case of performing a predetermined viewpoint change, the amount of presented information may also be dynamically controlled so as to switch left-eye and right-eye images that have been provided in the mode of enabling an omnidirectional binocular stereoscopic view to left-eye and right-eye images in the mode of enabling stereoscopic perception only in a partial region, and reduce visual influences exerted by the viewpoint change.

Second Modification

In the above-described embodiments, content objects to be stereoscopically perceived may be arranged closer to the rendering viewpoint than to a frame object, and therefore the method of projecting the content objects onto the viewing plane of the frame object is used, but implementation of the present invention is not limited thereto. That is to say, the frame object may also simply be a frame, or a window-like object in which a plane formed by the frame object has a transparent attribute, and can be arranged in a three-dimensional space. In this case, regarding a determined rendering viewpoint, rendering objects and the frame object may also be rendered, while assuming that the rendering objects are present only in a cone area defined by that rendering viewpoint and the frame object. In other words, it is needless to say that implementation of the present invention is not limited to provision of binocular stereoscopic content in the mode in which a plate-shaped object is viewed, and binocular stereoscopic content may also be provided in a mode in which a three-dimensional space beyond a hollow in a wall is viewed from the front side of this wall via the hollow.

Third Modification

In the above embodiments and modifications, a region in which content objects to be stereoscopically perceived are not provided in a binocular stereoscopic image is constituted by a plain image, and this plain image may be any kind of image that does not allow the viewer to stereoscopically perceive content objects, i.e. that does not cause disparity. That is to say, the plain image may also be an image that is arranged as distant scenery and in which objects for which disparity can be ignored are rendered, or may also be a blurred background image.

It is favorable that, in terms of reducing visual burden on the viewer, the plain image is an image that does not allow the viewer to stereoscopically perceive content objects, but an unpleasant feeling is less likely to be felt as a result of viewing if the image does not deviate from physical movement of the viewer. For this reason, a configuration may also be employed in which an image of binocular stereoscopic content that does not deviate from physical movement is presented in a region in which content objects to be stereoscopically perceived are not to be presented. That is to say, even with a configuration in which viewing representation that differs from physical movement of the viewer is limited to a partial region in the viewing region, binocular stereoscopic content can be presented in a mode favorable for the viewer, while ensuring appeal.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Also, the image generation apparatus and the image generation method according to the present invention are realizable by a program executing the methods on one or more computers. The program is providable/distributable by being stored on a computer-readable storage medium or through an electronic communication line.

This application claims the benefit of Japanese Patent Application No. 2017-051649, filed Mar. 16, 2017, which is hereby incorporated by reference herein in its entirety.

What is claimed is:

1. A non-transitory computer-readable recording medium storing a program,
the program causing a computer that generates a binocular stereoscopic image associated with content to execute:
acquisition processing for acquiring information regarding movement of a viewpoint of a viewer;
determination processing for determining a presence of an element to be stereoscopically perceived in the viewpoint of the viewer;
when the element to be stereoscopically perceived is determined to be present in the viewpoint of the viewer,
perform a first generation processing in a first region of the viewpoint of the viewer for rendering and generating left-eye and right-eye images that cause a spatial disparity between the left-eye and right eye images to provide a binocular stereoscopic view corresponding to the movement of the viewpoint of the viewer in the first region, and
perform a second generation processing in a second region of the viewpoint of the viewer for rendering a two-dimensional view corresponding to the movement of the viewpoint of the viewer in the second region; and
when the element to be stereoscopically perceived is determined not to be present in the viewpoint of the viewer, perform a third generation processing of entirety of the viewpoint of the viewer for rendering a two-dimensional view corresponding to the movement of the viewpoint of the viewer,
wherein, the first region includes the element to be stereoscopically perceived, and the element to be stereoscopically perceived is not included in the second region.

2. The recording medium according to claim 1, wherein an element rendered in the first region is an element contained in a cone area defined by a frame object arranged in a three-dimensional space corresponding to the content and each one of left-eye and right-eye rendering viewpoints.

3. The recording medium according to claim 2, wherein, in the first generation processing, rendering for the first region is performed as rendering of a plate-shaped object in a state of projecting the element contained in the cone area onto a plane defined by the frame object.

4. The recording medium according to claim 2, wherein the frame object is a hollow object indicating a frame edge, or an object with a frame in which a transparent attribute is set within the frame, and
in the first generation processing, rendering for the first region includes processing for masking an element that is not contained in the cone area.

5. The recording medium according to claim 2, wherein, if the viewpoint of the viewer has moved and passed through the plane defined by the frame object from a viewing plane side to a non-viewing plane side, restriction on the first region is reduced in the first generation processing.

6. The recording medium according to claim 2, wherein if predetermined representation with viewpoint movement or representation with viewpoint switching is performed on the content, the first region is restricted in the first generation processing.

7. The recording medium according to claim 6, wherein if the predetermined representation with viewpoint movement or representation with viewpoint switching is performed, a plurality of the frame objects are arranged in the three-dimensional space, and
the first region includes a region that is rendered for each of the plurality of frame objects.

8. The recording medium according to claim 7, wherein the cone area associated with each of the plurality of frame objects is defined for a pair of left-eye and right-eye rendering viewpoints,
the element to be stereoscopically perceived is copied to each of the plurality of frame objects and is arranged in the three-dimensional space, and
in the first generation processing, rendering for the first region includes masking processing by which only an element corresponding to each frame object is to be rendered.

9. The recording medium according to claim 7, wherein a pair of left-eye and right-eye rendering viewpoints are defined for each of the plurality of frame objects, and
in the first generation processing,
an element contained in a cone area defined by each of the left-eye and right-eye rendering viewpoints and a corresponding frame object is rendered, and
the first region is configured by combining images rendered for the plurality of frame objects.

10. The recording medium according to claim 1, wherein, in a case where a binocular stereoscopic view is formed using the generated left-eye and right-eye images, the second region is constituted by an image that does not cause disparity to be perceived.

11. The recording medium according to claim 1, wherein the second region is constituted by a plain image.

12. An image generation apparatus that generates a binocular stereoscopic image associated with content,
the apparatus executes a program to cause at least one processor to perform:
acquiring information regarding movement of a viewpoint of a viewer;
determining a presence of an element to be stereoscopically perceived in the viewpoint of the viewer;
when the element to be stereoscopically perceived is determined to be present in the viewpoint of the viewer,
performing a first generation processing in a first region of the viewpoint of the viewer for rendering and generating left-eye and right-eye images that cause a spatial disparity between the left-eye and right eye images to provide a binocular stereoscopic view corresponding to the movement of the viewpoint of the viewer in the first region, and
performing a second generation processing in a second region of the viewpoint of the viewer for rendering a two-dimensional view corresponding to the movement of the viewpoint of the viewer in the second region; and
when the element to be stereoscopically perceived is determined not to be present in the viewpoint of the viewer, performing a third generation processing of entirety of the viewpoint of the viewer for rendering a two-dimensional view corresponding to the movement of the viewpoint of the viewer,
wherein, the first region includes the element to be stereoscopically perceived, and the element to be stereoscopically perceived is not included in the second region.

13. An image generation method for generating a binocular stereoscopic image associated with content, the method comprising:
acquiring information regarding movement of a viewpoint of a viewer;
determining a presence of an element to be stereoscopically perceived in the viewpoint of the viewer;
when the element to be stereoscopically perceived is determined to be present in the viewpoint of the viewer,
performing a first generation processing in a first region of the viewpoint of the viewer for rendering and generating left-eye and right-eye images that cause a spatial disparity between the left-eye and right eye images to provide a binocular stereoscopic view corresponding to the movement of the viewpoint of the viewer in the first region, and
performing a second generation processing in a second region of the viewpoint of the viewer for rendering a two-dimensional view corresponding to the movement of the viewpoint of the viewer in the second region; and
when the element to be stereoscopically perceived is determined not to be present in the viewpoint of the viewer, performing a third generation processing of entirety of the viewpoint of the viewer for rendering a two-dimensional view corresponding to the movement of the viewpoint of the viewer,
wherein, the first region includes the element to be stereoscopically perceived, and the element to be stereoscopically perceived is not included in the second region.

* * * * *